US009115701B2

(12) United States Patent
McGinnis et al.

(10) Patent No.: US 9,115,701 B2
(45) Date of Patent: Aug. 25, 2015

(54) OSMOTIC HEAT ENGINE (71) Applicant: Yale University, New Haven, CT (US)

(72) Inventors: Robert L. McGinnis, Cambridge, MA (US); Menachem Elimelech, New Haven, CT (US); Jeffrey McCutcheon, Coventry, CT (US)

(73) Assignee: Yale University, New Haven, CT (US)

( * ) Notice: Subject to any disclaimer, the term of this patent is extended or adjusted under 35 U.S.C. 154(b) by 0 days.

(21) Appl. No.: 13/965,653

(22) Filed: Aug. 13, 2013

(65) Prior Publication Data

US 2014/0165566 A1     Jun. 19, 2014

Related U.S. Application Data

(63) Continuation of application No. 12/513,762, filed as application No. PCT/US2007/023541 on Nov. 8, 2007, now abandoned.

(60) Provisional application No. 60/858,245, filed on Nov. 9, 2006.

(51) Int. Cl.
    *F01K 25/06*      (2006.01)
    *F01K 25/08*      (2006.01)
    (Continued)

(52) U.S. Cl.
    CPC *F03G 7/005* (2013.01); *F03G 7/04* (2013.01); *Y02E 10/28* (2013.01); *Y02E 10/34* (2013.01)

(58) Field of Classification Search
    CPC ........... F03G 7/005; F03G 7/04; Y02E 10/28; Y02E 10/34
    USPC .................................................. 60/645–684
    See application file for complete search history.

(56) References Cited

U.S. PATENT DOCUMENTS 3,130,156 A   *   4/1964   Neff .............................. 210/177
3,587,227 A      6/1971   Weingarten
(Continued)

FOREIGN PATENT DOCUMENTS

CN      2695490 Y      4/2005
DE      3121968 A1     1/1983
(Continued)

OTHER PUBLICATIONS

Cath, T. Y. et al., "Forward osmosis: Principles, applications, and recent developments", Journal of Membrane Science, 281 :70-87 (Elsevier, 2006).
International Search Report for PCT/US2007/203541 dated May 7, 2008.
(Continued)

*Primary Examiner* — Hoang Nguyen
(74) *Attorney, Agent, or Firm* — McCarter & English, LLP; Danielle L. Herritt; Wei Song (57) ABSTRACT

A method of converting thermal energy into mechanical work that uses a semi-permeable membrane to convert osmotic pressure into electrical power. A closed cycle pressure-retarded osmosis (PRO) process known as an osmotic heat engine (OHE) uses a concentrated ammonia-carbon dioxide draw solution to create high osmotic pressures which generate water flux through a semi-permeable membrane against a hydraulic pressure gradient. The depressurization of the increased draw solution volume in a turbine produces electrical power. The process is maintained in steady state operation through the separation of the diluted draw solution into a re-concentrated draw solution and deionized water working fluid, both for reuse in the osmotic heat engine.

17 Claims, 5 Drawing Sheets

(51) Int. Cl.
  *F03G 7/00* (2006.01)
  *F03G 7/04* (2006.01)

(56) References Cited

U.S. PATENT DOCUMENTS

| | | | |
|---|---|---|---|
| 3,906,250 | A | 9/1975 | Loeb |
| 3,978,344 | A | 8/1976 | Jellinek |
| 4,141,825 | A | 2/1979 | Conger |
| 4,177,146 | A | 12/1979 | Popper et al. |
| 4,193,267 | A | 3/1980 | Loeb |
| 4,347,704 | A | 9/1982 | Marquardt et al. |
| 4,689,156 | A | 8/1987 | Zibrida |
| 5,439,757 | A | 8/1995 | Zito |
| 5,622,605 | A | 4/1997 | Simpson et al. |
| 6,185,940 | B1 | 2/2001 | Prueitt |
| 7,178,337 | B2 | 2/2007 | Pflanz |
| 7,566,402 | B2 | 7/2009 | Thorsen et al. |
| 7,780,852 | B2 | 8/2010 | DeVoe |
| 7,871,522 | B2 | 1/2011 | Stover et al. |
| 7,898,102 | B2 | 3/2011 | Alstot et al. |
| 7,922,873 | B2 | 4/2011 | St. Germain et al. |
| 8,099,958 | B2 | 1/2012 | Al-Mayahi et al. |
| 2005/0145568 | A1* | 7/2005 | McGinnis ............ 210/639 |
| 2006/0225420 | A1 | 10/2006 | Al-Mayahi et al. |
| 2009/0091139 | A1* | 4/2009 | Al-Mayahi et al. ........ 290/1 R |
| 2010/0183903 | A1 | 7/2010 | McGinnis et al. |
| 2013/0029405 | A1* | 1/2013 | Hickey ............ 435/266 |

FOREIGN PATENT DOCUMENTS

| | | |
|---|---|---|
| JP | 57-012802 | 1/1982 |
| RU | 2110118 C1 | 4/1998 |
| RU | 2150021 C1 | 5/2000 |
| SU | 1636654 A1 | 3/1991 |
| WO | 02/13955 A1 | 2/2002 |
| WO | WO 0213955 A1 * | 2/2002 |
| WO | 02/060825 A2 | 8/2002 |
| WO | 2005/017352 A1 | 2/2005 |
| WO | 2007/033675 A1 | 3/2007 |

OTHER PUBLICATIONS

Loeb, S., "Energy production at the Dead Sea by pressure-retarded osmosis: challenge or chimera?", Desalination, 120:247-262 (Elsevier, 1998).
Loeb, S., "Large-scale power production by pressure-retarded osmosis, using river water and sea water passing through spiral modules", Desalination, 143:115-122 (Elsevier, 2002).
Loeb, S., "One hundred and thirty benign and renewable megawatts from Great Salt Lake? The possibilities of hydroelectric power by pressure-retarded osmosis", Desalination, 141 :85-91 (Elsevier, 2001).
McCutcheon, Jeffrey R. et al., Desalination by ammonia-carbon dioxide forward osmosis: Influence of draw and feed solution concentrations on process performance, Journal of Membrane Science, 2006, vol. 278, pp. 114-123.
McCutcheon, Jeffrey R., Robert L. McGinnis, and Menachem Elimelech. "A novel ammonia-carbon dioxide forward (direct) osmosis desalination process." Desalination 1741 (2005): 1-11.
McGinnis, R. L. et al., "A novel ammonia—carbon dioxide osmotice heat engine for power generation", Journal of Membrane Science, 305: 13-19 (Elsevier B. V. 2007).
Mehta GO et al. Internal polarization in the porous substructure of a semipermeable membrane under pressure-retarded osmosis. J Membrane Sci 4:261-5 (1978).
Mehta GO et al. Performance of Permasep B-9 and B-10 membranes in various osmotic regions and at high osmotic pressures. J Membrane Sci 4:335-49 (1979).
Mehta GO. Further results on the performance of present-day osmotic membranes in various osmotic reQions. J Membrane Sci 10:3-19 (1982).
Office Action (original and English translation) from corresponding Chinese patent application No. 200780048785.8 dated Jan. 26, 2011.
Office Action from corresponding Japanese application No. 2009-536297 dated Jan. 10, 2012.
Panyor L. Renewable energy from dilution of salt water with fresh water: pressure retarded osmosis. Desalination 199:408-10 (2006).
Search Report dated Nov. 30, 2011, from Eurasian patent application No. 201170750, corresponding to US 2010-0183903-A 1.

* cited by examiner

OSMOTIC HEAT ENGINE

CROSS REFERENCE TO RELATED APPLICATIONS

This application is a continuation of U.S. application Ser. No. 12/513,762, accorded a 371(c) filing date of May 6, 2009, which is the U.S. National Stage of international Patent Application No. PCT/US2007/023541, filed Nov. 8, 2007, which claims the benefit of U.S. Provisional Application No. 60/858,245, filed Nov. 9, 2006, the subject matter of which is herein incorporated by reference in their entireties.

GOVERNMENT SUPPORT

This invention was made with government support under N00014-05-1-0801 awarded by the Office of Naval Research. The government has certain rights in the invention.

FIELD OF INVENTION

The present invention relates to osmotic heat engine for converting thermal energy into mechanical work that uses a semi-permeable membrane to convert osmotic pressure into electrical power.

BACKGROUND OF THE INVENTION

Increased global demand for energy, along with widening regulation of carbon dioxide emission, have expanded interest in renewable energy sources and improved efficiencies in fuel use. However, an important restriction regarding the adoption of new fuels and energy technologies is the cost of power produced by these means. While subsidies and other forms of artificial support may assist in the introduction of these renewable energy sources, successful displacement of traditional fuels must necessarily be driven by total energy costs.

Pressure retarded osmosis (PRO), or "salinity power" as it is often referred to, is a membrane-based osmotic pressure energy conversion process. PRO utilizes osmotic flow across a semi-permeable membrane to generate electricity. PRO processes are discussed for example in U.S. Pat. No. 3,906,250 to Loeb, U.S. Pat. No. 3,587,227 to Weingarten et al., and U.S. Pat. No. 3,978,344 to Jellinek, the subject matter of each of which is herein incorporated by reference in its entirety.

At first, locations considered suitable for using PRO technology focused on river deltas at saline water bodies such as the ocean, Dead Sea or the Great Salt Lake. At these locations, an osmotic pressure gradient exists where freshwater from a river freely mixes with seawater. The PRO process utilizes this chemical energy and converts it into electricity. In the prior art PRO processes, saline water is pressurized and placed opposite of the freshwater water across a semi-permeable membrane. The osmotic pressure difference between the seawater and the freshwater (which is greater than the hydraulic pressure induced on the seawater) causes osmotic flux to occur across the membranes. As flux occurs into the pressurized seawater, the pressure is relieved by expansion through a hydroturbine (or other means) which generates electricity.

PRO processes at river deltas, also know as "open loop" PRO, have several operational and design limitations. First is the need for extensive pretreatment of feed and draw streams, similar to that required in desalination processes, to prevent fouling of process membranes and components.

Another difficulty arises from the low differential osmotic pressures found between many natural feed waters. That is, the available osmotic pressure difference is not extraordinarily high unless the saline water body is hypersaline, such as the Dead Sea or the Great Salt Lake. Unfortunately, the volumetric flow of water into these water bodies is somewhat small and hence will yield limited power for even a well designed PRO process. Sea water, for example, has an osmotic pressure of approximately 2.53 MPa (25 atm), which does not allow for the high hydraulic pressures that are desirable for efficient power production. In cases where higher concentration streams are considered, high hydraulic pressures may be used, but the process efficiency will suffer significantly from internal concentration polarization (ICP) which occurs in the support structure of the membrane used for the process. This phenomenon is particularly exacerbated by the increased support layer thickness required to resist the increased hydraulic pressures enabled by more concentrated streams.

A final consideration is the need to place power facilities at the interface between natural streams, often areas considerable environmental importance, such as estuaries, wetland and bays.

However, the primary obstacle to a viable PRO process is poor membrane performance. Previous investigations into PRO have found that membrane flux performance was too poor to make power generation a viable option. Low flux rates require the use of more membrane area to achieve enough volumetric flow to generate power and are due to a phenomenon called concentration polarization.

Flux occurs from the dilute "feed" solution (freshwater) into the concentrated "draw" solution (sewater). As this happens, solutes build up along the surface of the membrane along the feed side. On the permeate side of the membrane, solvent dilutes the dissolved solutes along the membrane surface. Since the solute concentrations at the membrane surface dictate the true osmotic pressure difference across the membrane, these concentration polarization phenomena must be minimized to ensure high fluxes. The severity of the concentration polarization phenomena can be mitigated by crossflow, wherein turbulent flow near the membrane surface can reduce the thickness of these boundary layers.

Unfortunately, membranes currently in use are asymmetric in structure. In these membranes, a thin separating layer (the layer which rejects the salt, also called the "active layer") is supported by a porous support layer which provides mechanical strength to the membrane. These membranes have been designed for pressure driven membrane processes, such as reverse osmosis (RO). In reverse osmosis, these support layers do not inhibit flow since water is literally being forced through the membrane by hydraulic pressure. On the other hand, in osmotic flow, the osmotic pressure driving force is established only over the thin active layer. The porous support layer plays a significant, and often hindering, role in osmotic flux performance.

Figure 1:
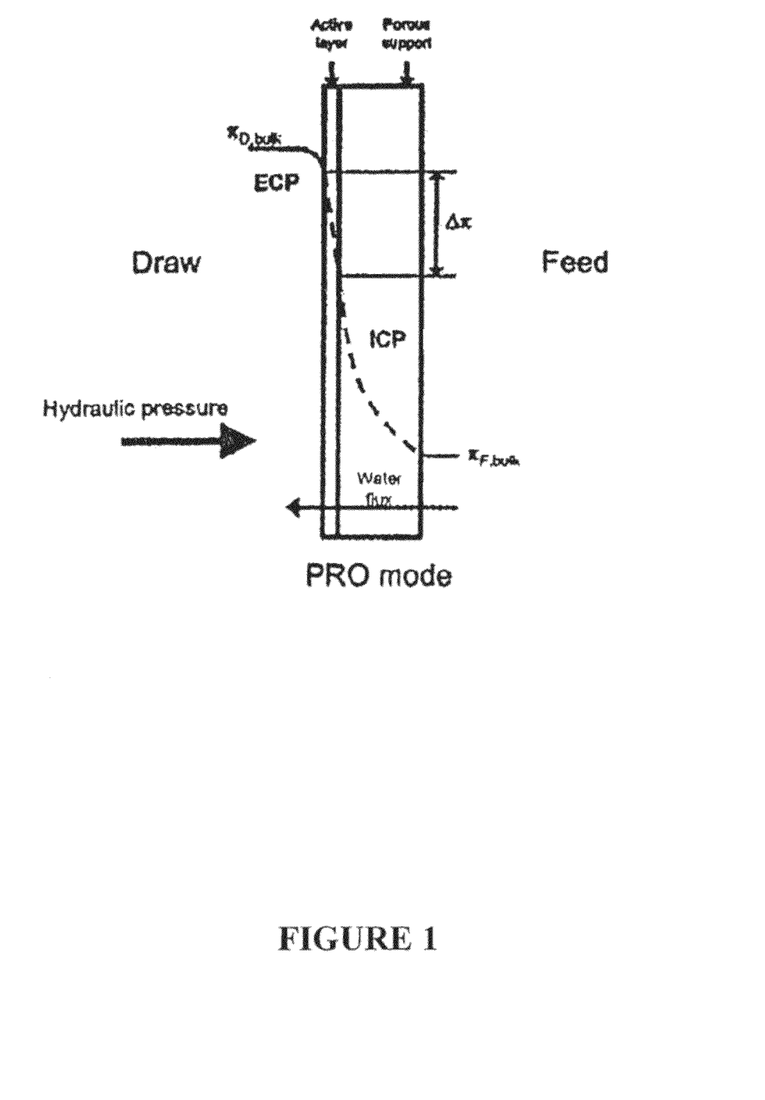
FIG. 1 depicts the PRO process is the presence of internal combustion polarization on the feed side of the membrane an external concentration polarization on the draw solution side of the membrane.

As illustrated in FIG. 1, a significant concentration polarization layer can form within the porous support layer on the feed side. Called "internal concentration polarization" (ICP), this layer impacts the osmotic pressure to a much greater extent than concentration polarization layers external to the membrane (ECP). Minimization or elimination of ICP is critical for viable performance of pressure retarded osmosis. The membrane must still be able to reject salt to a high degree, however and be highly permeable to water.

For PRO applications, the draw solution must have a high osmotic pressure in order to generate reasonable amounts of power. In river delta PRO, however, the osmotic pressure gradients are rather small. Smaller osmotic pressure gradients require more membrane area to generate large volumetric flows. This problem, coupled with ICP and fouling phenomena make the available osmotic pressure even smaller. Other issues associated with the draw solute include compatibility with the system components and the membrane. Seawater may be corrosive to metal parts and both freshwater and seawater may contain biological components that cause biofouling to system components, including the membrane.

River delta PRO also runs in an open-loop configuration. This means that the feed and the draw solutions are returned to the ocean after the PRO process is complete. When the seawater and river water are brought into the PRO system, they must be filtered and disinfected to prevent fouling and biofilm formulation, respectively. In addition to adding to the overall cost of the project, any chemicals that are added to these waters must either be flushed out to sea or be removed through physical or chemical means. Disposal of disinfection chemicals and disinfection byproducts can have unforeseen environmental impacts. Diversion of river water may also have an environmental impact on delicate river delta ecology.

Thus, in order to create a viable pressure-retarded osmosis process, the use of closed cycle PRO systems, which are intended to use low temperature heat to recycle an osmotic agent, have been proposed. This approach does not capitalize on natural salinity gradients but instead explores the use of osmotic pressure as a medium for the production of work, enabling the conversion of environmentally benign low temperature heat sources to electrical power. In several processes, the draw solution is a solution of an ioinic salt, such as sodium, chloride, as described for example in U.S. Pat. No. 3,906,250 to Loeb. Heat applied to the OHE would re-concentrate the draw solution by vaporizing a portion of the water into steam, which would then be condensed to form the de-ionized working fluid. Other processes involve the removal of a volatile organic solute, or the chemical precipitation of solutes followed by their re-dissolution.

A primary difficulty faced by these OHEs is poor thermal efficiency due to high heat input requirements for water and organic solute vaporization. In the case of chemically precipitable solutes, chemical feed stock consumption can pose difficulties to economic operation. An additional challenge is the difficulty of obtaining solute separation complete enough to avoid concentration polarization (CP) effects in the feed water. This is not a problem when water is vaporized and re-condensed as distilled working fluid, hut could pose a significant problem when using removable draw solutes which are difficult to remove completely.

This points to an additional, reoccurring challenge in osmotically driven membrane processes—the difficulty of identifying a solute which may both create high osmotic pressures and be highly removable for reuse. Near complete removability is very important, because internal concentration polarization effects in the working fluid (feed solution) can drastically reduce membrane water flux. Thus, the ideal osmotic heat engine would use a draw solute that has the following features; (1) highly soluble; (2) completely removable; (3) has a high diffussvity for effective mass transfer in the membrane system, and (4) requires less heat for solute removal that that required for the vaporization of water or highly soluble organic solutes.

The invention described herein attempts to overcome some of the noted problems of the prior art by proposing an alternative means of power production, that use osmotic pressure to generate electrical power from sources of low-grade heat. While several prior investigations of the use of osmotic phenomena to produce power have been conducted, such as those used to convert "salinity power" from the mixing of natural saline and fresh water streams, relatively few studies have focused on the use of osmotic phenomena to produce power through the conversion of heat.

SUMMARY OF THE INVENTION

It is an object of the present invention to provide an osmotic heat engine that includes dilute (nearly deionized) water as a working fluid and a membrane that is configured such that internal concentration polarization does not hinder the osmotic flow of water across the membrane.

It is another object of the present invention to provide an osmotic heat engine having a draw solute that is fully compatible with all system components.

It is still another object of the present invention to provide an osmotic heat engine that uses a draw solute that is highly soluble and completely removable.

It is still another object of the present invention to provide an osmotic heat engine having a draw solute that provides for a large osmotic pressure gradient.

It is yet another object of the present invention to provide an osmotic heat engine that mitigates the environmental impacts of the PRO process.

To that end, the present invention relates generally to a closed loop PRO process that utilizes a recyclable draw solute.

In one embodiment, the present invention relates to a method of generating power using an ammonia-carbon dioxide osmotic heat engine, comprising the steps of:
  a) pressurizing a concentrated draw solution to a hydraulic pressure lower than its osmotic pressure on a first side of a semi-permeable membrane;
  b) introducing a dilute (nearly deionized) working fluid on an opposite side of the semi-permeable membrane;
  c) causing a portion of the dilute working fluid to flow through the semi-permeable membrane into the pressurized draw solution to create a water flux that expands the volume of the draw solution;
  d) inducing flow of the expanded volume of the draw solution through a turbine to produce power; and
  e) processing the expanded volume of the draw solution through a distillation column at a suitable temperature and pressure to separate the solutes from the draw solution, thereby producing new draw solution and working fluid streams for reuse in the system.

BRIEF DESCRIPTION OF THE DRAWINGS

For a fuller understating of the invention, reference is made6 to the following description taken in connection with the accompanying figures, in which.

DETAILED DESCRIPTION OF THE PREFERRED EMBODIMENTS

The present invention relates generally to a method of generating power using an ammonia-carbon dioxide osmotic heat engine comprising the steps of:
a) pressurizing a concentrated draw solution to a hydraulic pressure lower than its osmotic pressure on a first side of a semi-permeable membrane, wherein the concentrated draw solution comprises ammonia and carbon dioxide;
b) introducing a dilute working fluid on an opposite side of the semi-permeable membrane, wherein the dilute working fluid comprises nearly deionized water;
c) causing a portion of the dilute working fluid to flow through the semi-permeable membrane into the pressurized draw solution to create a water flux that expand the volume of the draw solution;
d) inducing flow of the expanded volume of the draw solution through a turbine to produce power; and
e) processing the expanded volume of the draw solution through a distillation, column at a suitable temperature and pressure to separate the solutes from the draw solution, thereby producing new draw solution and working fluid streams for reentry into the system.

The osmotic heat engine described herein is designed to compete with other types of heat engines including gas turbines (Brayton Cycle), steam turbines (Rankine Cycle), internal combustion engines (gasoline, diesel), and external combustion engine (Stirling engines).

The present invention relates to a closed cycle osmotic heat engine. The system uses an ammonia-carbon dioxide draw solution and a deionized water working fluid. The deionized water working fluid comprises water that is substantially (or nearly) deionized. What is meant by nearly deionized is that the deionized water working fluid contains less than 1 ppm ammonia and carbon dioxide and no other solutes. The draw solution is highly soluble, osmotically efficient and contains entirely removable and recyclable solutes. The use of deionized water as a working fluid maximizes membrane mass transfer by eliminating internal concentration polarization effects.

The draw solution comprises ammonium salts formed by the introduction of ammonia and carbon dioxide into water and is used in the OHE of the invention to generate electrical power. The draw solution is formulated by mixing ammonium bicarbonate salt with ammonium hydroxide to form a complex solution of ammonium salts comprising ammonium bicarbonate, ammonium carbonate and ammonium carbamate. The amount of ammonium hydroxide added is minimized to minimize the concentration of unionized ammonia in the draw solution. The concentrated draw solution has an ammonia to carbon dioxide ratio of between about 1:1 to 2.5:1. In addition, the draw solution has a concentration of between 0.1 and 12 molar, preferably between about 3 to about 6 molar.

This draw solution has several desirable characteristics, including (1) high solubility of the ammonium salts; (2) relatively low molecular weight and high diffusivity of the chemical species leading to high osmotic pressures and moderate external concentration polarization effects; (3) solutes that are almost completely removable in that the ammonium salts, upon heating with the draw solution at an appropriate temperature and pressure (for example 60° C. at 101.3 kPa (1 atm), decompose to ammonia and carbon dioxide gases that may be readily removed to levels of less than 1 ppm; and (4) the thermal energy required for the removal and recycling of these solutes from a quantity of water is significantly less than that required to vaporize the water itself.

In the ammonia-carbon dioxide osmotic heat engine of the invention, the concentrated draw solution is pressurized to a hydraulic pressure lower than its osmotic pressure, a dilute working fluid (deionized water containing less than 1 ppm ammonia and carbon dioxide) flows through the semi-permeable membrane into the pressurized solution, and this water flux expands the volume of the draw solution, inducing flow through a turbine, producing power. Heat is introduced to the osmotic heat engine, to drive a separation of the solutes from the draw solution, resulting in renewed draw solution and working fluid streams. A pressure exchanger similar to those used in reverse osmosis (RO) desalination is used to maintain the pressure of the draw solution side of the membrane in steady state operation.

The present invention uses a recyclable draw solute in PRO, where heat is input to the system which serves to regenerate the draw solute and excess heat is rejected to the environment in some way. The system is known as an "osmotic heat engine" because heat is absorbed and rejected and work is produced. While different conceptions of this type of system, have previously been configured, ether poor membrane performance and/or inefficient use of heat limited further development, due in part to the inadequate performance of the selected draw solution agents and severe internal concentration polarization effects.

Figure 2:
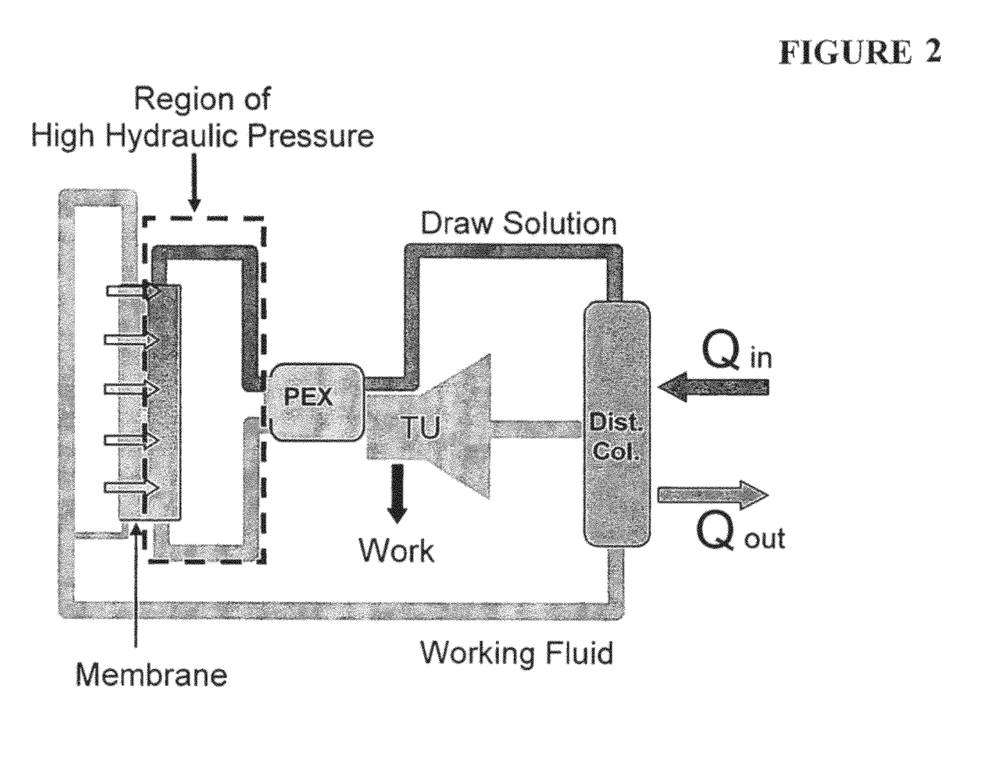
FIG. 2 depicts an osmotic heat engine system in accordance with the present invention.

In order to overcome the deficiencies of the prior art, the present invention proposes the use of ammonia-carbon dioxide ($NH_3$—$CO_2$) osmotic heat engine. This heat engine is illustrated is FIG. 2 and uses a mixture of ammonia and carbon dioxide gases mixed in solution. These gases form highly soluble ammonium salts in solution, which can generate osmotic pressures of over 250 atmospheres, more than 10 times that of seawater. The draw solution is highly soluble, osmotically efficient, and contains highly removable and recyclable solutes. The use of deionized water as a working fluid maximizes membrane mass transfer by eliminating internal concentration polarization effects. The results provided herein demonstrate the feasibility of the osmotic heat engine for the practical conversion of low temperature heat sources to power.

The osmotic heat engine of the invention relies on the use of a deionized water (i.e., containing little or no dissolved solutes) working fluid. The use of this fluid as a feed to the membrane is advantageous because no ICP occurs. While salt leakage from the draw solution through the membrane may cause ICP, the membrane is chosen to reject salt to a high degree, which will serve to counteract this tendency. The membrane is a semi-permeable membrane that has an active layer oriented toward the draw solution and a backing layer oriented toward the feed solution. The water flux that expands the volume of the draw solution is typically at least about $25 \times 10^{-6}$ $m^3/m^2$-s.

One of the keys to the efficient osmotic beat engine process of the invention is the heat required to separate pure water from the diluted draw solution. This is where the benefit of using ammonia and carbon dioxide draw solution becomes apparent, because these gases may be successfully stripped from water using low temperature steam. Modeling of gas removal using Aspen HYSYS® (available from Aspen Technology, Burlington, Mass.) has shown that steam with temperatures as low as 40° C. can be utilized under a vacuum gas stripping process. This allows for the utilization of a variety of heat sources that have typically little utility and very low to no cost.

The $NH_3$—$CO_2$ osmotic heat engine's utilization of low grade heat is critical to its viable implementation as an electricity generating alternative. Low grade heat sources come from a variety of industries including metal manufacturing (steel mills), glass manufacturing, oil refining and thermoelectric power generation, by way of example and not limitation. All of these industries use elaborate methods of reclaiming their waste heat, but low grade heat is always lost to the environment through water cooling or flue gases.

Renewable sources of heat may also be used. Geothermal heat sources are abundant but are rarely of high enough quality to directly generate electricity. Typically, these sources may be used to heat and cool homes, but can also be used in a binary cycle configuration which utilizes the heat to vaporize a secondary liquid, such as ammonia, and expand that vapor through a turbine. The vapor can then by condensed by rejecting heat to the air or surface water. A similar concept of using warm water in the ocean is ocean thermal energy conversion (OTEC). This system comprises an engine which utilizes the warm surface ocean water as a heat source and the cold deep ocean water as a hear sink. Similar to the geothermal binary cycle, OTEC uses warm water to vaporize a liquid, like ammonia, which then expands through a turbine. The gas is then condensed with the cold deep ocean water and recycled. For both of these processes, a gas is being used as the working fluid and hence a large turbine must be used (i.e., at least about 10 meters in diameter for steam turbine OTC). This is a design limitation that can be alleviated replacing the ammonia vapor system commonly used with the osmotic heat engine of the invention. By using the warm water to strip the $NH_3$—$CO_2$ draw solution and the cold water to condense these gases, the working fluid directed through the turbine to generate power is instead a liquid. This is of significant benefit, as hydroturbines are much smaller than turbines designed to use lower density gases, and are vary efficient at converting work into electricity.

A benefit of the osmotic heat engine of the present invention is the ability to successfully convert low grade heat sources into electrical energy. The configuration of the heat engine of the invention solves many of the previous economic and environmental issues of river outlet. PRO due to its closed loop configuration and recyclable draw solute. Utilizing low grade heat sources also provides an essentially cost-free energy source because the cost of the energy is related only to the capital cost of the equipment amortized over the life of the equipment and maintenance. The heat required for separating the draw solutes from solution is typically Introduced at a temperature of between about 35 and 250° C. Furthermore, the temperature required for separating the draw solutes from solution is proportional to pressure and pressure is typically introduced at about 0.05 to about 10 atm.

Example

Flux experiments were conducted in the laboratory to determine the viability of the osmotic heat engine process of the invention. Water flux most be high if the generation of power is to be efficient. Previous tests on flux using reverse osmosis membranes showed that the flux rarely exceeded minimum values (no more than 2-3 gallons per foot squared membrane area, per day (gfd) and often much less than 1 gfd).

Figure 3:
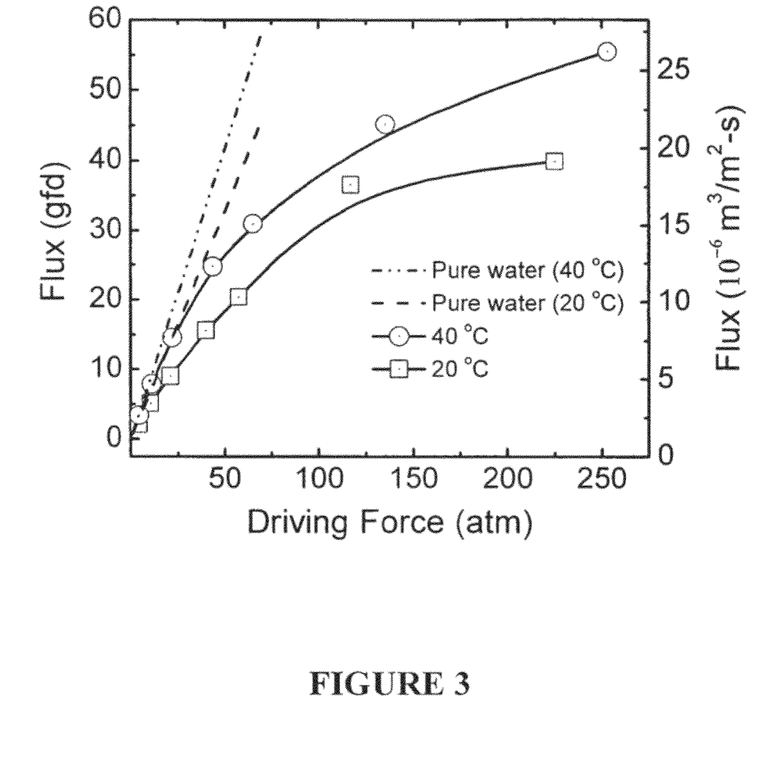
FIG. 3 depicts flux data and demonstrates the relationship between water flux and draw solution concentration for the membrane.

The inventors investigated a commercially available membrane which is tailored for osmotic processes and found flux to be much better. The data was taken with the $NH_3$—$CO_2$ draw solution on the active layer of the membrane. A deionized water feed was used to simulate osmotic heat engine conditions. Two temperatures were evaluated: 20° C. and 40° C. and the feed and draw solutions were maintained at identical temperatures for both series of tests. The results are shown in FIG. 3.

Two temperatures were tested over a range of osmotic pressures. Fluxes over 50 gfd were obtained in some tests, suggesting that this particular membrane used is 50 times better than some previously tested membranes, which has a significant impact on the amount of membrane needed to produce a given amount of electricity. Higher fluxes yield smaller requirements for membrane area. Note that the permeate stream was not pressurized in these tests (and was not pressurized in previous investigations either).

From this data power generation data can foe estimated by modeling the process in Aspen HYSYS® (available from Aspen Technology, Burlington, Mass.). Using various draw solution concentrations over a range of permeate, pressurization, the amount of energy generation can be calculated by using the following equation:

$$\text{Work} = (\text{Turbine efficiency}) \times (\text{Hydraulic pressure}) \times (\text{Volume flux}) \quad (1)$$

Figure 4:
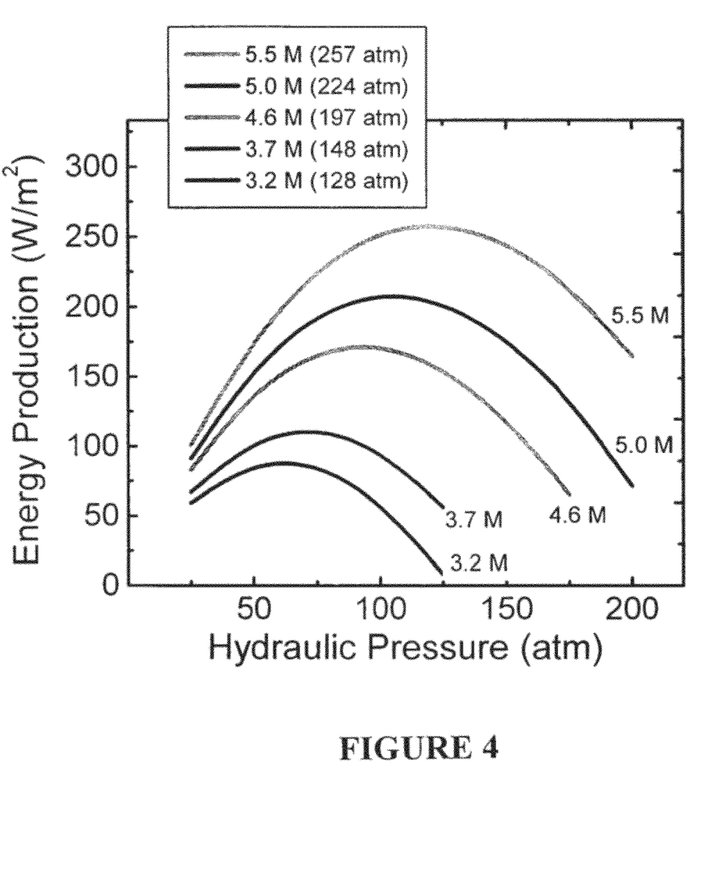
FIG. 4 depicts the membrane power density relative to hydraulic and osmotic pressures in the osmotic heat engine of the invention.

Turbine efficiency often exceeds 90% and overall driving force causes flux across the membrane. As hydraulic power in the permeate stream is increased, flux decreases, but a maximum power generation point is established. FIG. 4 illustrates this feature for a range of draw solution concentrations and demonstrates how various draw solution concentrations perform in the osmotic heat engine of the invention over a range of permeate side hydraulic pressure. The energy production was modeled using Aspen HYSYS® (available from Aspen Technology, Burlington, Mass.).

It is important to note that the expected energy production from natural salinity gradients, such as those present at river/seawater interfaces, would be far lower than these modeled energy outputs. Using previously investigated membranes, the power output per membrane area in open fresh/seawater PRO was at most 1.4 W/m². This data demonstrates that the $NH_3$—$CO_2$ osmotic heat engine of the invention, using this tailored osmotic membrane can exceed that output by 200 times under certain configurations. Since membrane area is also used as the metric for capital cost and because the heat input to the system is essentially free, higher energy production per membrane area values have a direct bearing on the total cost of the electricity being produced.

In addition, projections of the performance of the ammonia-carbon dioxide OHE of the invention were also based on experimental data for water flax, calculations of power conversion efficiency in the turbine and pressure recover systems, and modeling of the energy requirements for the removal and recycling of the OHE draw solutes.

Measurements of water tins through semi-permeable membranes oriented in the PRO configuration (backing layer toward feed, active layer toward draw solution) provide data for estimations of engine performance. Membrane water flux data was obtained using a crossflow membrane cell and associated system components. The dimensions of the channel were 77 mm long by 26 mm wide by 3 mm dep. Mesh spacers were inserted within both channels to improve support of the membrane as well as to promote turbulence and mass transfer. A viable speed peristaltic pump (available from Masterflex of Vernon Hills, Ill.) with a dual pump head was used to pump both the feed and draw solutions in a closed loop. A constant temperature, water bath (available from Neslab of Newington, N.H.) was used to maintain both the feed and draw solution temperatures. Heat transfer took place within the water bath through inline stainless steel heat exchanger coils which were submerged in the stirred bath. The draw solution rested on a scale (available from Denver Instruments of Denver, Colo.) and weight changes were measured over time to determine the permeate water flux. The membrane was placed in the cell such that the draw solution was against the active layer and the feed solution was against the support layer.

The membrane used to collect flux data was designed for forward osmosis desalination and was obtained from Hydration Technologies, Inc. (Albany, Oreg.). The chemical makeup of the membrane is proprietary, but is believed to contain cellulose acetate polymers. The structure is asymmetrical with a separating layer supported by a relatively thin (i.e., less than about 50 µm) support structure. Further support is provided by a polyester mesh embedded within the polymer support layer.

Osmotic water flux was determined for a range of draw solution concentrations. The draw solution was made by mixing ammonium bicarbonate salt ($NH_4HCO_3$) with ammonium hydroxide ($NH_4OH$), forming a complex solution of ammonium salts, comprised of ammonium bicarbonate, ammonium carbonate and ammonium carbamate, with the later being the most abundant in concentrated solutions. The amount of $NH_4OH$ added was varied depending on the concentration of the draw solution and the temperature at which it was to be used. The amount of $NH_4OH$ was minimized to minimize the concentration of unionised ammonia in the draw solution. Properties of the draw solutions used in modeling of the OHE, including osmotic pressure, density, viscosity and pH, were obtained with Aspen HYSYS® (available from Aspen Technology, Burlington, Mass.), in conjunction with an electrolyte property package from OLI Systems, Inc. (Morris Plains, N.J.).

Experimental membrane water flux data were used to calculate fitted (apparent) mass transfer coefficients for predictions of external concentration polarization (ECP) at the interface between the membrane and the concentrated draw solution used to drive engine water flux. ECP effects for a concentrated draw solution in an OHE membrane system are predicted with the fitted mass transfer coefficient and based on film theory with highly concentrated ECP effects calculated based on extrapolation form the experimental data. This model fitting and extrapolation is considered necessary in light of the expected significance of ECP effects with the OHE's membrane system and the inadequacy of traditional film theory to describe mass transfer phenomena in highly concentrated non-ideal solution flows. The predicted membrane fluxes using the fitted efficiency were found to correlate well with observe water flux performance, within the range of experimental data.

Water flux measurements under unpressurized conditions are assumed to predict flax, in the pressurized OHE system, of the invention, following the governing equation for PRO under differing osmotic and hydraulic pressure conditions:

$$J_w = A(\sigma \Delta \pi_m - \Delta P) \quad (2)$$

Here, A is the water permeability coefficient, $\sigma$ the reflection coefficient, $\Delta \pi_m$ the difference in osmotic pressures across the membrane between the draw and feed solution at the separation interface (i.e., the membrane active layer surface), and $\Delta P$ is the hydraulic pressure difference between the draw solution side and the working fluid. $\Delta \pi_m$ is calculated from the bulk osmotic pressure of the draw solution after accounting for ECP effects as discussed above.

It was assumed that $\sigma=1$ in all calculations because of the relatively high rejection of the FO membrane used. Furthermore, the water permeability coefficient A is assumed to be independent of the applied hydraulic pressure, implying negligible membrane compaction. The selection of the membrane, operating pressures, and temperature of the system includes the accuracy of predictions based on these assumptions.

The power produced by the OHE (W) is a function of the quantity of water moving through its turbine per unit of time (V), the drop in pressure in that turbine which is equal to the applied hydraulic pressure on the draw solution side ($\Delta P$), and the turbine efficiency (E):

$$W = EV\Delta P \quad (3)$$

The turbine efficiency E is typically greater than 90%. The efficiency of the pressure exchanger used to maintain steady state pressurization of the draw solution is typically greater than 95%. The combined efficiency of these two components is approximated, in the modeling effort described herein, to an overall efficiency of 90% for projections of power production, captured in the value of 0.90 for E in Equation 2 above. The volume flowing through die turbine per unit time (V) Is equal to the product of the water flux through the membranes of the OHE ($J_w$) and the total membrane surface area. This flux is a function of both the hydraulic and osmotic pressures of the system, as shown by Equation 1 above. Increasing the hydraulic pressure relative to the osmotic pressure increases the power output per unit volume of water through the turbine, but will also reduce the total volume of water by reducing membrane water flux. Reducing hydraulic pressure will have the inverse effect.

Thermal efficiency is calculated by measuring the quantity of power produced relative to the quantity of heat used (for the separation and recovery of the draw solution). There are two measures of efficiency which may be considered in evaluating an engine's performance: thermal efficiency and Carnot efficiency. Thermal efficiency is simply the ratio of engine power output over heat input. Carnot efficiency is a measure of the efficiency of an engine relative to that of a Carnot engine, one which produces the maximum theoretical quantity of work from a given heat flow, based on a perfectly reversible process.

The "quantity of heat" component of engine efficiency can be calculated based on the heat duty of the distillation column used to separate the ammonia and carbon dioxide from the dilute draw solution, producing a re-concentrated draw solution and deionized working fluid. The column heat duty was modeled with Aspen HYSYS® (available from Aspen Technology, Burlington, Mass.) in conjunction with an electrolyte property package from OLI Systems, Inc., (Morris Plains, N.J.), following the procedures used in estimating the energy demands of forward osmosis desalination.

The efficiency of a Carnot engine ($\eta$) is given by $$\eta = 1 - \frac{T_L}{T_H} \quad (4)$$

where $T_H$ is the absolute temperature of heat delivered to the engine (from fuel combustion, for example) and $T_L$ is the absolute temperature at which heat is rejected to the environment. Measuring OHE efficiency against the efficiency of a Carnot engine establishes how effective the OHE is relative to the quantity of heat it uses. A geothermal power plant using 200° C. heat, for example, obtaining a thermal efficiency of 20%, would not, by the thermal efficiency measure, seem to be a very efficient plant. The Carnot efficiency of such an engine, however, would be 55%, approximately equally to the Carnot efficiency of a coal fired power plant operation at 537° C. This is a particularly useful method of comparison between heat engine technologies when considering heat sources as low as 20° C. above ambient temperatures, where maximum theoretical thermal efficiencies are quite low.

As the difference is osmotic pressure between two solutions increases, the flux through a semipermeable membrane separating the two will increase as well. This relationship is not linear, due to concentration polarization effects at the surface of the membrane. In PRO mode (draw solution on active layer side of membrane) with deionized water as the feed, only external concentration polarization is expected to occur, assuming very high rejection of salts by the membrane. FIG. 3 illustrates the relationship between water flux and draw solution concentration for the membrane.

Osmotic water flux performance of the membrane was evaluated using an unpressurized $NH_3/CO_2$ draw solution with deionized water as the feed stream, with feed and draw solutions isothermal. The driving force is calculated based on the bulk osmotic pressure of the draw solution. Dashed lines indicated pure water hydraulic permeability determined from reverse osmosis tests with the same membrane. Differences between these lines and experimental data are due to external concentration polarization.

Data are shown for 20 and 40° C., with the feed and draw solutions in each case isothermal. Flux is shown relative to the osmotic pressures of the draw solutions. Higher temperatures lead to higher water fluxes due to the effects of temperature on the membrane water permeability and the diffusivity of the draw solutes. With the FO membrane operated in the PRO mode with a deionized water feed, water flux exceeds $25 \times 10^{-6}$ $m^3/m^2$-s (or 50 gallons per square foot of membrane per day, GFD). The nonlinear relationship shown is due to ECP, caused by dilution of the draw solution at the membrane surface on the permeate side of the membrane. These experimental flux data are used to calculate the power output of the OHE as described below.

One criterion for optimizing the OHE is to select hydraulic, and osmotic pressures which produce the highest power output per membrane area, or highest membrane "power density." The power density is calculated based on membrane water flux, draw solution hydraulic pressure, and anticipated ECP effects in the OHE membrane system. The ECP effects were calculated using a fitted mass transfer coefficient of $1.78 \times 10^{-5}$ m/s, determined through experimental flux measurements in the PRO mode. The combined efficiency of the hydroturbine and pressure recovery device was assumed to be 90%. The relationship between the osmotic and hydraulic pressures in the OHE, relative to the membrane power density is shown in FIG. 4. Each curve corresponds to a fixed ammonia-carbon dioxide draw solution concentration.

The modeling indicated that the maximum membrane power density is achieved when the hydraulic pressure is approximately 50% of the osmotic pressure. For an OHE with a hydraulic pressure of 10.13 MPA (100 atm), the power density provided by use of a 4.6 M draw solution producing 19.16 MPa (197 atm) of osmotic pressure is approximately 170 $W/m^2$, this is quite high as compared to the power densities expected of river/seawater salinity PRO power plants, which are typically in the under 4 $W/m^2$ range.

The power density may be further increased by increasing the crossflow velocity of the draw solution stream (to reduce ECP effects) or the hydraulic, pressure, of the OHE membrane system. Modeling of an OHE with significantly Increased crossflow velocities (5 m/s in a 0.05 cm high flow channel), indicates that OHE power densities would be increased by approximately 61% over those of a membrane system with the fluid dynamics of the test cell used in the study described herein (0.46 m/s in an 0.3 cm high channel). For an OHE operating at 10.13 MPa (100 atm) hydraulic pressure, the maximum power density would be about 274 $W/m^2$ in this scenario.

Modeling of an OHE with a 20.26 MPa (200 atm) hydraulic operating pressure indicates that power densities would be increased by an additional 47% over those of a 10.13 MPa (100 atm) system, increased crossflow velocity, however, will result in additional power consumption, and increased hydraulic pressure will require more expensive process components. These operating conditions will necessarily be factors in process optimization, balanced against correlating factors of process fluid pump power consumption and equipment capital and replacement costs.

The Carnot efficiency of the OHE was modeled over a range of osmotic and hydraulic pressures. In the calculation of engine thermal efficiency, the heat and electrical duties of the draw solution separation and recycling process are compared to the electrical production of the OHE power generating turbine for the combination of osmotic and hydraulic pressures examined. Because the electrical energy needed for the draw solute separation and recycling is negligible, the thermal efficiency is practically the ratio between the electrical energy produced by the OHE and the thermal energy required for the draw solute separation. This efficiency is compared to the theoretical efficiency of a Carnot engine operating with the same high and low temperature heat streams, giving a "percentage of Carnot efficiency" measure of OHE performance.

To determine the heat and electrical duty of the draw solute removal and recycling process, a draw solution of sufficient concentration to produce the osmotic pressure desired is specified in a HYSYS® chemical simulation model. This solution stream is directed to a distillation column with characteristics appropriate for the removal. One example of such a model specifies a single distillation column, effecting the separation of draw solutes from a 6 M ($CO_2$ basis) draw solution, stream (which generates 31.94 MPa (315.26 atm) osmotic pressure in the OHE membrane system, containing structured packing 2.35 m (7.7 ft) in height (30 theoretical stages) supplied with heat at 50° C. A column of this type operates at a bottom pressure and temperature of 10.62 kPa (0.1048 atm) and 46.96° C. (given a 3° C. ΔT in the reboiler heat exchanger), and a top pressure and temperature of 10.54 kPa (0.1040 atm) and 35.55° C. The stream fed to the top of the column is preheated to 32° C. with an energy requirement of 3196.8 $MJ/m^3$ (per $m^3$ working fluid produced). The column heat, duty is 3454.6 $MJ/m^3$, supplied to the reboiler. Supplementary heating required to maintain all streams at specified temperatures is 385.7 $MJ/m^3$, for a total heat duty of 7037.1 $MJ/m^3$. The electrical duty for fluid pumping in the separation process is relatively negligible (0.48 $MJ/m^3$). A summary of the heat and electrical duties required for the separation of the draw solute at typical concentrations used in the simulations is provided in Table 1. This table also provides some of the properties of the draw solution that are relevant to modeling OHE performance.

| Draw Solute concentration (M) | Osmotic pressure (atm) | $NH_3/CO_2$ ratio | Heat Duty ($MJ/m^3$) | Electrical Duty ($MJ/m^3$) |
|---|---|---|---|---|
| 1 | 43.7 | 1.1 | 358.0 | 0.12 |
| 2 | 84.4 | 1.2 | 593.4 | 0.13 |
| 3 | 120.1 | 1.2 | 865.7 | 0.16 |
| 4 | 157.8 | 1.3 | 1319.0 | 0.19 |
| 5 | 229.6 | 1.6 | 2847.7 | 0.26 |
| 6 | 319.7 | 1.8 | 7037.1 | 0.48 |

Figure 5:
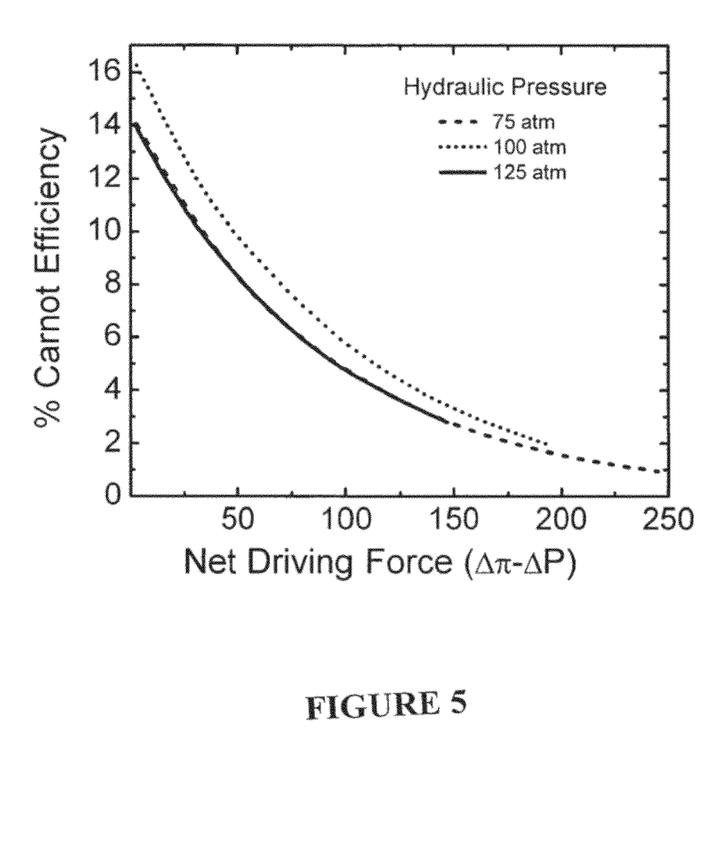
FIG. 5 depicts the osmotic heat engine efficiency as a percentage of Carnot engine efficiency, relative to the difference between the hydraulic and osmotic pressures of the draw solution.

The overall Carnot efficiency of the OHE was calculated based on modeling as described above, over a range of supplied hear temperatures. Over a variety of temperatures the efficiencies were remarkably consistent. In FIG. 5, the Carnot efficiencies for OHEs operating with 50° C. heat are shown, over a range of osmotic and hydraulic pressures in the OHE membrane system. For each combination of pressures, the temperatures were held constant, with a high temperature, or temperature of energy supplied of 50° C. and a low temperature, or temperature of the ambient environment of 25° C.

FIG. 5 represents OHE engine efficiency as a percentage of Carnot engine efficiency, relative to the difference between the hydraulic and osmotic pressures of the draw solution. For a high temperature of 50° C. and a low temperature of 25° C. the percentage of maximum theoretical engine efficiency (Carnot) reaches a maximum of approximately 16% as the net driving force ($\Delta\pi-\Delta P$) approaches zero. The osmotic pressure $\Delta\pi$ is based on the bulk osmotic pressure of the draw solution.

The results indicate that the highest engine efficiency is obtained when the difference between osmotic and hydraulic pressures approaches zero. Given equal osmotic and hydraulic pressure at equilibrium in a zero-flux condition, increases in osmotic pressure will increase membrane wafer flux, thereby Increasing the amount of power produced by the OHE turbine. Increases in osmotic pressure are achieved by increasing the draw solution concentration. Higher concentration draw solutions require more energy for solute removal and recycling in the form of supplied heat. Therefore, as osmotic pressure is increased, power production, membrane water flux, and heat duty required by the solute recycling system ail increase concurrently.

The distillation column used for the solute recycling system is however inefficient in its removal of $NH_3$ and $CO_2$ from the dilute draw solution. Some water vapor is also removed, requiring heat which, may not be converted to power production. As the concentration of the draw solution is increased, the amount of water vapor created in the distillation column increases as well, and this inherent inefficiency of separation results in decreasing OHE efficiency overall. This increase in osmotic pressure does however result in increased water flux, which benefits OHE operation through increased membrane power density. Higher membrane power densities require less membrane area for a given energy capacity and thus less membrane cost. This represents a tradeoff between membrane capital cost and engine efficiency, which must be optimized in the design of an OHE system.

As is seen from the above discussion, although overall engine efficiency is fairly low, approaching a maximum of 16% Carnot efficiency, and likely operating at an efficiency of 5-10%, the power output per membrane area can be quite high, in excess of 250 $W/m^2$ of membrane area. In one embodiment, the power output per membrane area of the osmotic heat engine is at least 150 $W/m^2$. If the OHE uses thermal energy sources in the range of 40-100° C., the cost of energy input to the engine may approach negligibility. An important consideration would be the capital and labor costs of the process and their impacts on the cost of electricity produced.

The use of the ammonia-carbon dioxide osmotic heat engine of the invention allows for power production from diverse energy sources such as heat from the reject streams of existing power plants, otherwise unproductive low temperature geothermal heat sources, low-concentration solar thermal energy, biomass heat (non-combustion) and ocean thermal energy conversion, among others, in all of these cases the process of the invention produces power that is renewable and carbon-free.

While the invention has been described above with reference to specific embodiments thereof, it is apparent that many changes, modifications, and variations can be made without departing from the inventive concept disclosed here. Accordingly, it is intended to embrace ail such changes, modifications, and variations that fall within the spirit and broad scope of the appended claims. All patent applications, patents, and other publications cited herein are incorporated by reference in their entirety.

What is claimed is:

1. A method of generating power, comprising:
providing a closed cycle ammonia-carbon dioxide osmotic heat engine, wherein the step of providing the engine comprises:
pressurizing, with a pressure exchanger, a concentrated draw solution comprising ammonia and carbon dioxide on a first side of a semi-permeable membrane to a hydraulic pressure lower than its osmotic pressure;
introducing a portion of deionized dilute working fluid on an opposite side of the semi-permeable membrane, wherein the deionized dilute working fluid contains less than 1 ppm ammonia and carbon dioxide and no other solutes;
causing a portion of the dilute working fluid to flow through the semi-permeable membrane into the pressurized draw solution to create a flux that expands the volume of the draw solution, thereby creating a dilute draw solution;
inducing flow of the dilute draw solution through a turbine to produce power;
thermally separating ammonia and carbon dioxide from the dilute draw solution; and
recycling the ammonia and carbon dioxide to re-concentrate the concentrated draw solution.

2. The method according to claim 1, wherein the concentrated draw solution has an ammonia to carbon dioxide molar ratio of between 1 to 1 and 2.5 to 1.

3. The method according to claim 1, wherein the concentrated draw solution has a concentration of between 0.1 molar and 12 molar.

4. The method according to claim 3, wherein the concentrated draw solution has a concentration of between 3 molar and 6 molar.

5. The method of claim 1, wherein thermally separating ammonia and carbon dioxide from the dilute draw solution comprises a gas stripping process.

6. The method of claim 5, wherein the gas stripping process comprises use of low temperature steam.

7. The method of claim 6, wherein the gas stripping process is performed at a temperature of between 35° C. and 250° C. and a pressure of between 0.05 atm and 10 atm, wherein the temperature is proportional to the pressure.

8. The method of claim 1, wherein the flux is at least $25\times10^{-6}$ $m^3/m$-s.

9. The method of claim 1, wherein the concentrated draw solution is pressurized to a hydraulic pressure approximately 50% of the osmotic pressure of the concentrated draw solution.

10. An osmotic heat engine, comprising:
a membrane system comprising a semi-permeable membrane having a first side and an opposite side;
a source of a dilute working fluid fluidly connected to the opposite side of the membrane, wherein the deionized dilute working fluid contains less than 1 ppm ammonia and carbon dioxide and no other solutes;

a source of a concentrated draw solution comprising ammonia and carbon dioxide fluidly connected to the first side of the membrane to create an osmotic pressure on the first side of the membrane system to cause a flux across the membrane;

a pressure exchanger coupled to the first side of the membrane to pressurize the concentrated draw solution to a hydraulic pressure lower than the osmotic pressure of the concentrated draw solution;

a turbine fluidly connected to the membrane system downstream of the first side of the membrane;

a separation apparatus fluidly connected downstream of the turbine to separate thermally ammonia and carbon dioxide from the dilute draw solution; and a recycle system fluidly connected to the first and opposite sides of the membrane.

11. The osmotic heat engine according to claim 10, wherein the concentrated draw solution has an ammonia to carbon dioxide molar ratio of between 1 to 1 and 2.5 to 1.

12. The osmotic heat engine according to claim 10, wherein the concentrated draw solution has a concentration of between 0.1 molar and 12 molar.

13. The osmotic heat engine according to claim 12, wherein the concentrated draw solution has a concentration of between 3 molar and 6 molar.

14. The osmotic heat engine of claim 10, wherein the separation apparatus comprises a gas stripper.

15. The osmotic heat engine of claim 14, further comprising a source of low grade heat thermally connected to the gas stripper.

16. The osmotic heat engine of claim 10, wherein power output per membrane area of the osmotic heat engine is at least 150 $W/m^2$.

17. The osmotic heat engine of claim 10, wherein the pressure exchanger pressurizes the concentrated draw solution to a hydraulic pressure approximately 50% of the osmotic pressure of the concentrated draw solution.

* * * * *